April 29, 1924.

L. PEYRET

GLIDER

Filed May 11, 1923

Inventor.
Louis Peyret

Patented Apr. 29, 1924.

1,492,262

UNITED STATES PATENT OFFICE.

LOUIS PEYRET, OF COURBEVOIE, FRANCE.

GLIDER.

Application filed May 11, 1923. Serial No. 638,291.

*To all whom it may concern:*

Be it known that I, LOUIS PEYRET, a citizen of the French Republic, residing at Courbevoie, Department of Seine, France, have invented certain new and useful Improvements in Gliders, of which the following is a specification.

This invention relates to gliders and refers more particularly to those which do not employ an engine.

It has for its principal object to combine in a glider certain constructional details most of which are already known in aviation and in the construction of apparatus of the class in question, but a few of which are new considered separately, the combination being effected in such a way that the machine responds better than has hitherto been the case to the various requirements which have to be met in a practical glider.

The machine is constructed with a view to securing the following advantages:—

Semi-automatic longitudinal stability which is not affected even in the case of almost total loss of relative velocity of the machine with respect to the wind, that is even in the case where the angle of incidence of the relative wind approaches 90°:

Facilities for destroying or re-establishing longitudinal or transverse equilibrium even with a relative wind at a normal angle but with very small velocity:

Simplicity and above all efficiency in the means for controlling the devices for securing longitudinal and transverse equilibrium, that is to say great facility for maneuvering:

The utilization of the whole spread of the machine for the transverse extension of the planes:

A good field of view for the pilot:

Solidity and lightness.

Improvement as regards the means for launching the machine.

The reality of the progress made throughout the world with machines constructed according to the invention is confirmed by the good results which these machines have shown on the occasion of various glider competitions in which they have participated.

The principal results obtained are the following:—

At Itford Hill, in Great Britain, on 21st October 1922, with a wind of from 12 to 15 metres per second, a flight was accomplished lasting for 3 hours 22 minutes, which constituted, at that time a world's record and extended into the night.

At Vauville, in France, on 29th January 1923, with a wind of from 9 to 20 metres per second, a flight was accomplished of 8 hours 4 minutes 50 seconds in duration, which constitutes in fact the official record as to duration of flight.

At Vauville in France, on 26th February 1923, with a wind of from 15 to 25 metres, a straight flight was accomplished of 7 km. 750, the distance being flown over in 41 minutes. This performance constitutes the actual official record as to distance.

One example of a glider constructed according to the invention is described in the following specification with reference to the annexed drawings, in which:—

The same numerals of reference are employed to designate like parts in all the views.

The machine comprises a fuselage consisting of a longitudinally extending body having a trapezoidal section except in the place where the pilot's cabin is located, in which place the section is approximately rectangular. This body is surmounted by a portion approximately triangular in section, in such a way that the fuselage at the top represents a kind of roof with sharply sloping sides.

Figure 3:
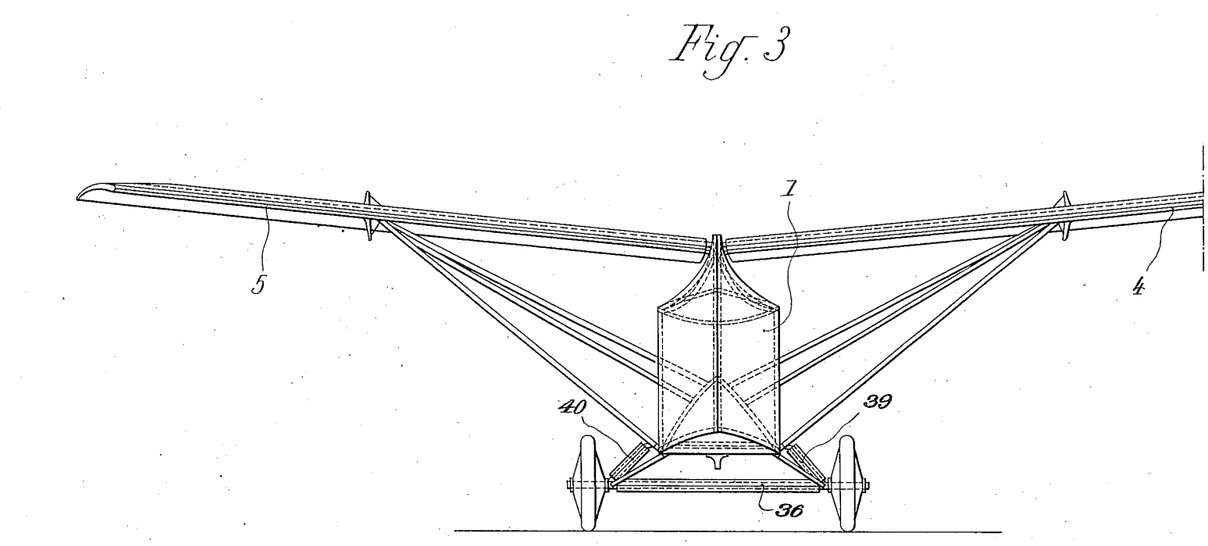
Fig. 3 is a front view of the machine.

Immediately in front and also to the rear of the pilot's cabin, the triangular section of the roof is provided with incurved slopes, as seen at Fig. 3, so as to improve the field of view. 2 is an upper longéron forming the ridge of the skeleton of the roof, and four other longérons form the corresponding edges of the skeleton of the fuselage.

The before mentioned longéron 2 extends throughout the whole length of the fuselage, even over the cabin, the longéron passing above the head of the pilot. In this way sufficient resistance is obtained for the fuselage where the sections are broken. This arrangement constitutes a particular feature of the present construction.

Figure 4:
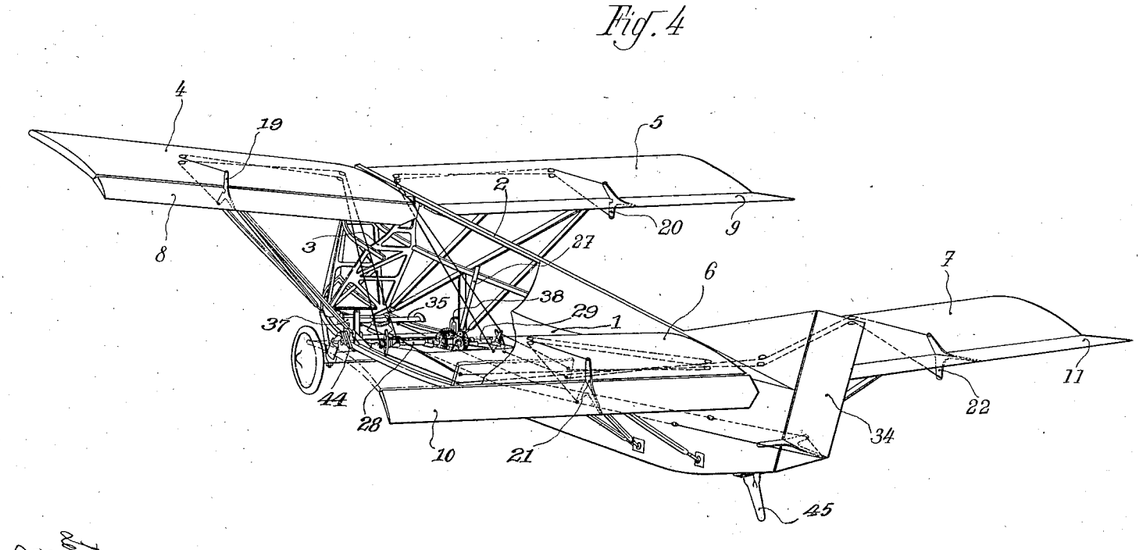
Fig. 4 shows in part diagram with a portion of the outer parts of the fuselage and a portion of the left hand plane at the rear removed, the same machine in order to illustrate in particular the means utilized for the re-establishment of equilibrium and the system adopted for controlling such means.
Figure 5:
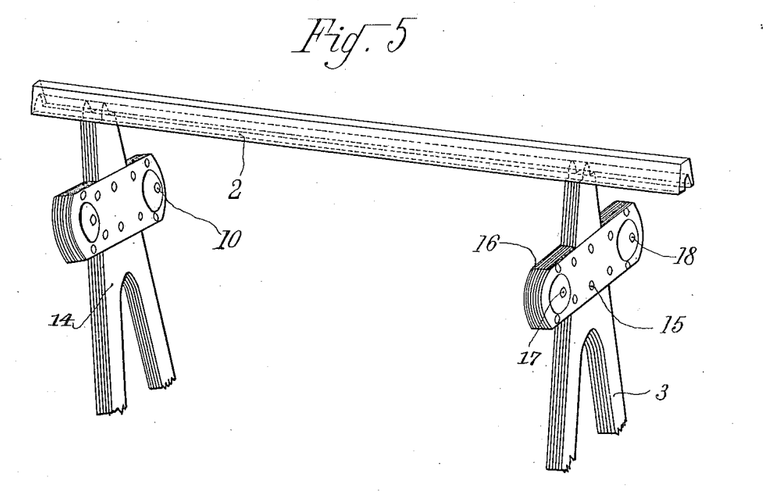
Fig. 5 is a diagrammatic perspective view to a larger scale of means constructed according to the invention for the attachment of the tubular longérons for a pair of planes of the machine, not shown on the drawing, the means consisting of four shoulders.

The five longérons of the fuselage are held transversely by eight members such as 3 (Figs. 4 and 6) which members may be called "coupling members." They are arranged at distances apart and are cut from ply wood which is obtained in the usual manner by superposing and cementing together a plurality of layers of wood. Fig. 4 only shows two of these coupling members, the actual number used being greater. Fig. 5 shows two neighbouring coupling members.

The whole skeleton or framework of the fuselage is covered with ply wood which is very thin, so that the fuselage owing to its relatively great height produces a powerful drifting surface. This constitutes a characteristic of the invention. Moreover the covering of ply wood gives the fuselage great power to resist torsion and this is particularly necessary in view of the arrangement of the wing planes.

As regards the planes the machine comprises two pairs of planes disposed in tandem. The wing system is therefore of the so called Langley type.

The two pairs of wing planes comprise four wings, of identical construction and having the following characteristics:—

Each of these wings comprises a fixed portion such as that denoted by 4 as regards the front left hand wing; by 5 as regards the right hand front wing; by 6 as regards the left hand rear wing; and by 7 as regards the right hand rear wing.

Each also comprises a movable portion or aileron, such as that denoted by 8 with regard to the left hand forward wing; by 9 with regard to the right hand forward wing; by 10 with regard to the left hand rear wing and by 11 with regard to the right hand rear wing.

These ailerons extend across the whole spread of each of the wing planes.

The ailerons 8, 9, 10 and 11 have a relatively great size in the direction from front to back, the dimensions being in the neighbourhood of the half of the corresponding portion of the fixed wing plane. The arrangement and the large surface of the ailerons constitute a characteristic feature of the invention.

The wing planes are connected to the fuselage at the ridge of the roof of the latter so that the whole spread of the machine is utilized for the transverse extension of the wing planes.

The arrangement of the planes is of the "triple V" type, that is to say that in the first place the front wing planes are mounted with a greater angle of incidence with regard to the axis of the fuselage, than the rear wing planes (see Fig. 1), in the second place the wing planes form (as seen from the front in Fig. 3) dihedrals the apex of which is turned downwards, and in the third place the wing planes show (as seen in plan at Fig. 2) a V formation, the point of the V being directed towards the front of the machine. This arrangement of planes as a triple V formation, which is well known, tends to give the machine semi-longitudinal and transverse stability as well as stability when in motion.

The actual construction of the wing planes involves nothing of particular interest. The fixed portion of each wing plane comprises two tubular longérons (such as 12 and 13 in the fixed portion 4 in Fig. 2) and to these longérons are attached or threaded the stays and members forming the framework.

The shoulders for attachment of the wing planes are placed in the neighbourhood of the ridge of the roof like structure extending along the upper surface of the fuselage. Owing to the fact that they are attached very high up with regard to the fuselage, the vertical surfaces of the latter form drifting surfaces entirely below the wing planes. This arrangement counteracts a dangerous tendency with respect to the transverse V formation, a tendency which without the powerful drifting surface provided would lead to deviation of the machine in the way of yawing when the machine is exposed to the influences of currents of wind coming from the side.

In order to constitute the shoulders for the attachment of the wing planes, the following construction is preferably provided:—

The shoulders are shaped in the coupling members such as 3, Fig. 4, or 3 and 14, Fig. 5. The coupling members are provided, for instance the coupling member 3, Fig. 5 at the part where the two shoulders are connected with metallic cover plates 15 and 16 riveted on the two surfaces of the coupling member so as to clamp the said portion. The plates are provided at their extremities with stamped portions forming sections of spheres. The plates are so arranged that the concavities formed therein are turned towards the outside and constitute parts of a sphere adapted to fit freely within the interior of the tubular longérons of the wing planes. Neither the wing planes nor their longérons are shown on Fig. 5.

The dimensions of the shoulders thus reinforced are such that the inner extremity of the longéron of a wing plane when fitted over the shoulder is held in all directions. Bolts, not shown in Fig. 5, pass through the central holes, such as 17 and 18, of the spherical recesses in the plates, and through the corresponding holes in the inner extremities of the tubular longérons of the planes, thus attaching them to the ridge of the fuselage. This construction again is one of the characteristic features of my invention.

The method of staying the two longérons of a wing plane has no features of particular interest. Stays are dispensed with above the wing plane and three stays are provided which are connected from the lower portion of the fuselage taking advantage of its great height and terminate a little beyond the half of the spread of the wing plane, resembling to some extent, as seen from the side, the form of a capital N, as will be seen from Figs. 1 and 2.

The positive means employed for deliberately disturbing or for re-establishing longitudinal and transverse equilibrium consist of the powerful ailerons 8, 9, 10 and 11 already mentioned which are hinged to the rear edge of the fixed portion of each wing frame. Their angular displacement is effected by means of special levers attached to the ailerons and designated respectively by 19, 20, 21 and 22 for the front left hand, front right hand, rear left hand and rear right hand wing planes. The said levers are controlled by suitable cables, connected at their ends to the free extremities of four primary two armed levers, designated respectively by 23, 24, 25 and 26 (Fig. 6) which are included in the mechanism operated by the hand lever 27 (Figs. 4 and 6).

Figure 6:
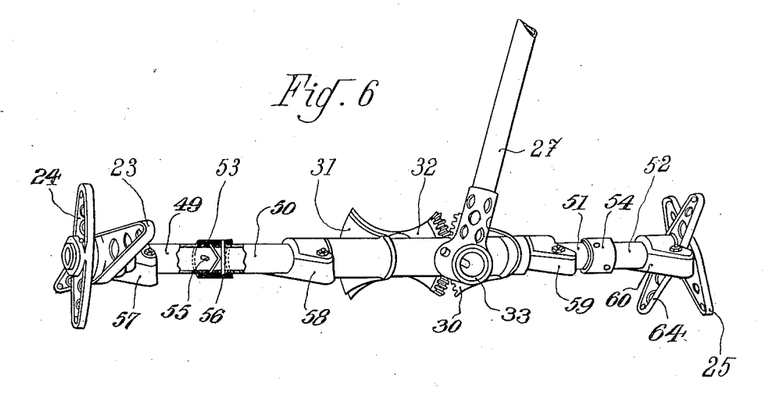
Fig. 6 shows in like manner, but with a portion in section one method of constructing a differential control of a known description generally called the "Laroze" control intended for re-establishing equilibrium both longitudinal and transverse, the said control being constructed according to the invention.

The general principle of the said mechanism is identical with mechanism of the so called Laroze type and it can be easily understood on inspection of Figs. 4 and 6.

The mechanism comprises a hand lever 27 operating two transverse controlling spindles, namely a left hand controlling spindle 28 and a right hand controlling spindle 29 (Fig. 4), one of these being placed in alignment with the other. These spindles meet almost at the middle of the device. A little before the middle position each of these two spindles is provided respectively with a bevel wheel, which may be seen on Fig. 4, such bevel wheels corresponding with the sectors 30 and 31 shown in Fig. 6. With these pinions or bevel wheels engages a planet pinion, corresponding to 32, Fig. 6, pivotally mounted upon a spindle 33 in a central device for carrying the said planet pinion. This device is pivotally mounted on the inner extensions of the said controlling spindles, so that the whole device consisting of the three bevel wheels or pinions corresponds to a differential. The hand lever 27 is rigidly keyed on the said spindle 33 of the planet pinion 32, so as to remain invariably at an angle of 90° with this spindle.

Under these conditions it suffices to displace the lever 27 in a direction from the front towards the back in order that the two controlling spindles may have an equal displacement in the same direction. If the lever 27 is moved only in a lateral direction, the rotation of the planet pinion 32 which then takes place, causes, as regards the controlling spindles 28 and 29, angular displacements in equal and opposite directions of an absolute amount. The effect of these displacements upon the ailerons is evident if the part of the cables for controlling them is followed upon Fig. 4.

The following points will be observed:—

The left hand front aileron is operated by means of crossed cables from the inner lever 23 on Fig. 6 from the left hand spindle, 28 on Fig. 4: and the right hand front aileron 9 is operated in the same manner from the lever also on the inside, 24 on Fig. 6, from the right hand spindle 29 on Fig. 4.

As will be observed from Fig. 4 the operating cables of the ailerons, namely 19 and 20, in place of passing directly backwards towards the hand lever 27, first extend forwardly and then return towards the said hand lever; that is they follow a round about course. If the cables were to extend directly from the levers 19 and 20 respectively towards the back the upper extremity of each of the said levers would have to be connected to the upper extremity of the operating levers 23 and 24. Assuming that the cables extend first of all to the front, crossing is necessary so that the effect remains the same. Again, according to Fig. 4, owing to the crossing of the cables, the upper extremities of the levers 19 and 20 are connected to the lower extremities of the controlling levers 23 and 24, and the operation remains correct.

The rear ailerons 10 and 11 are controlled by means of cables proceeding directly towards the hand lever but leading after leaving each of the ailerons to a controlling lever located at the other side of the mechanism. Each of these cables is crossed so that the effect may be the reverse of that obtained for the front ailerons.

Thus, the upper extremity of the outer lever 26, Fig. 6 of the left hand spindle is connected to the lower extremity of the lever 22 of the right hand rear aileron 11. The other aileron is operated in the same manner by the outer lever 25 Fig. 6 of the right hand spindle 29 Fig. 4.

With the foregoing constructions, the operation of the hand lever may be explained as follows:—

If the machine dips too much, the pilot pushes the lever 27 forward. The effect will be to raise the two front ailerons 8 and 9 and to lower the rear ailerons 10 and 11. This position of the ailerons has been illustrated at Fig. 4. Their disposition is then such as to counteract longitudinal movements or perturbations.

If the left hand wing plane dips too much, tending to raise the left hand side of the machine to an excessive degree, the pilot pushes the lever 27 towards the left. The result will be on the one hand to raise the left hand front aileron 8 through the action of the inner lever 23 from the left hand spindle 28, and also to raise the left hand rear aileron 10 through the action of the outer lever of the right hand spindle 29, on the other hand there will be simultaneous lowering of the front and rear right hand ailerons as will be readily grasped by analogy.

Consequently the arrangement is now adapted to overcome transverse perturbations.

It is obvious that an oblique displacement of the lever will produce any combination of movements for controlling the longitudinal and transverse equilibrium simultaneously.

The control of the four ailerons and the utilization of an apparatus of the Laroze type are characteristic features of my machine.

The operation of the plane or rudder for controlling the direction, which rudder is denoted by 34 is effected in a well known manner with the assistance of a member 35 (Fig. 4) controlled by the foot, which operates cables which are not crossed and which are connected to the levers of the vertical rudder.

Figure 7:
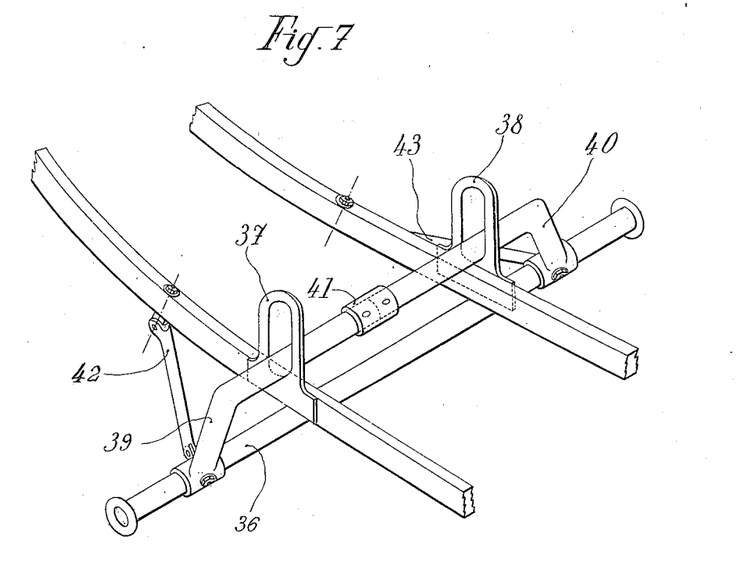
Fig. 7 represents in a like manner, the landing gear of the machine.

The landing gear comprises an axle 36 passing beneath the floor of the fuselage and carrying a pair of ordinary landing wheels (not shown on Fig. 7). 37 and 38 (Figs. 4 and 7) are two guides with vertical elongated eyes or slots, attached to the bottom of the side walls of the fuselage. 39 and 40 (Fig. 7) are two symmetrical tubular pieces adapted to be guided in the eyes or slots in the before mentioned guides. These pieces are bent so that their geometrical axes form obtuse angles. They are provided at their lower extremities with sleeves through which the aforesaid axle 36 is adapted to be passed. In their upper extremities are provided holes adapted to receive bolts. When the landing gear is assembled the two pieces 30 and 40 are connected together so as to constitute an inverted and very flat U with open arms, the connection being located in the vertical plane of symmetry of the machine and being constituted by a central sleeve 41 and a couple of bolts, and they are connected to the axle by other bolts which in this case are eye bolts passing through the said axle and the lower sleeves on the pieces 39 and 40. These pieces when in position constitute with the axle 36 a trapezoidal frame. The landing chassis is completed by two stays 42 and 43 connecting the two eye bolts passing through the axle 36 to two other eye bolts which are fixed on the lower side longérons of the fuselage a little behind the nose and ensure the guiding of the axle 36 in an arc of a circle. 44 are elastic devices, not shown at Fig. 7 but easily seen in Fig. 4 which pull the trapezoidal frame downwards. The general principle of this kind of landing chassis is known, the novelty residing in the particular details of construction which enable it to be easily taken to pieces or removed.

Figure 1:
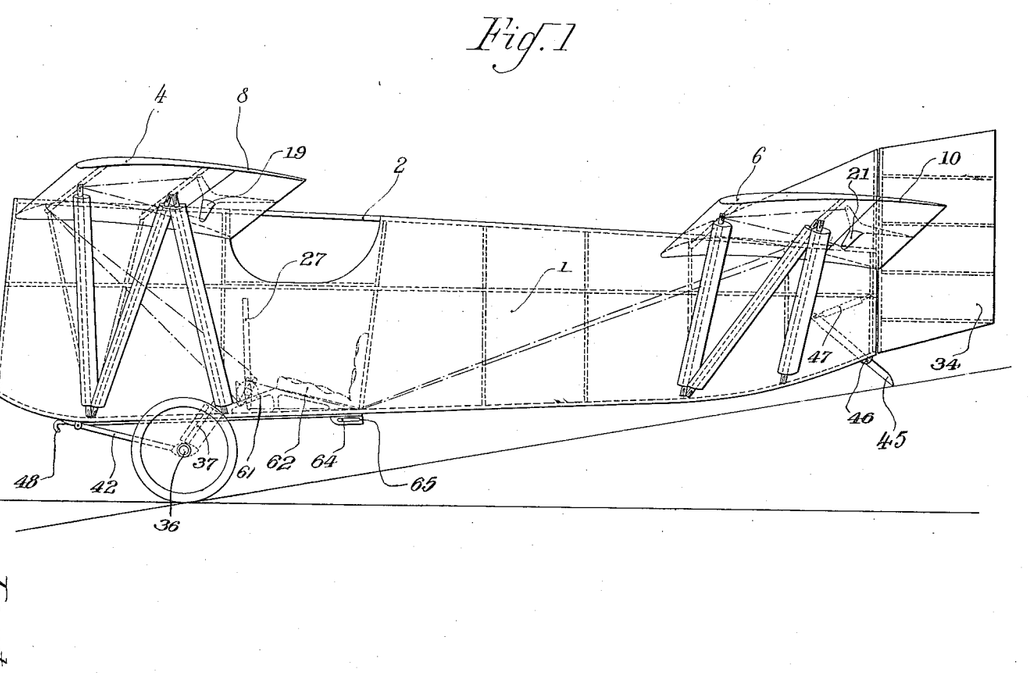
Fig. 1 is a diagrammatic elevation of the apparatus.
Figure 2:
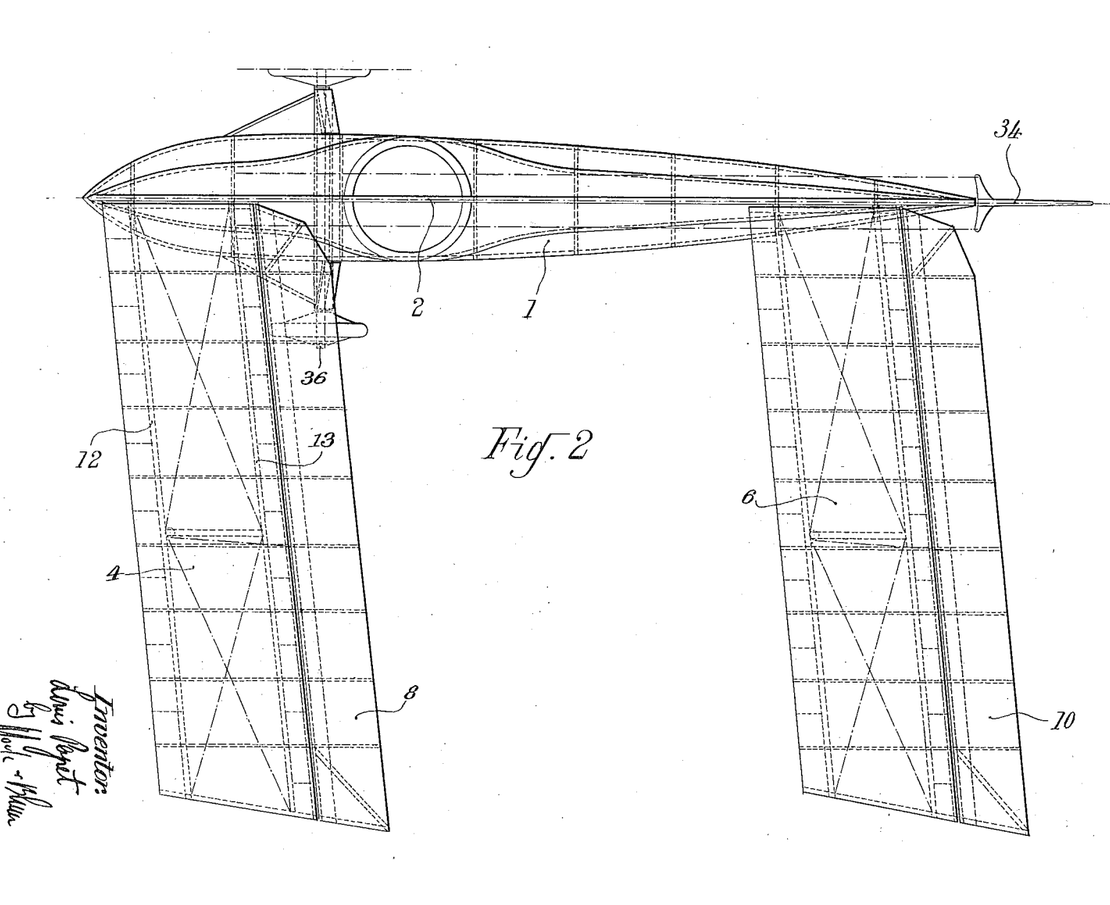
Fig. 2 is a plan with the planes on the right hand side of the machine removed.

The landing gear also comprises a rear jointed beak (Figs. 1 and 4) adapted to dig into the ground and hinged towards the middle, 46, Fig. 1 and controlled by an elastic device 47, Fig. 1.

As regards the launching of the machine, for this purpose the ordinary devices may be employed consisting in providing the front of the machine with a draw hook such as 48, Fig. 1. With this is engaged a powerful elastic cable (not shown on the drawing), the engagement being effected at the middle and the extremities being pulled forward by two devices operated by attendants, which devices store up the elastic energy, the machine itself being held in position by another device operated by the attendants and adapted to be freed upon a signal being given by the pilot from his seat.

The machine constructed upon the lines just described, behaves in an excellent way when in the air and only exposes the pilot to a minimum amount of fatigue by reason of its semi-automatic stability.

It possesses amongst other things the advantages enumerated in the preamble to this specification and fulfils the object set out as desirable by reason of the judicious combination of the resources of the art and the addition of certain features which are novel in themselves. It is moreover to be observed that the variations of the angle of instance, for the purpose of disturbing or re-establishing longitudinal and transverse equilibrium are effected throughout all the planes of the apparatus.

It is also to be noted that the field of view of the pilot is particularly good owing to the fact that the forward wing plane is located relatively high up so that the eye of the pilot is approximately in line with the chord of the wing plane and so that the pilot being placed behind the rear edge of the forward wing plane his field of view in the downward direction is unlimited.

In case of a fall the protection for the pilot is ensured to a maximum extent owing to the fact that there is a considerable amount of the fuselage in front of and behind him, whilst the two pairs of wing planes arranged in tandem protect him on the sides.

The machine may be completely constructed as already described, but in some cases I prefer to adopt the whole or part of the further improvements about to be described.

As regards the controlling system of the Laroze type, which has previously been described principally with reference to Fig. 4, each of the two spindles of the controlling device may be replaced by two part spindles 49, 50 and 51, 52, Fig. 6, connected together by tubular rings 53 and 54, the inner diameter of which is very slightly greater than the outer diameter of the said part spindles. The ring and the two part spindles take the place of a Cardan joint owing to the provision of two rivets such as 55 and 56 placed at right angles to one another. This Cardan joint has for its object to avoid the necessity of very accurate fitting of the four bearings 57, 58, 59 and 60 which carry the said Laroze system on a base 61, Fig. 1, extending in front of the pilot's seat 62. This base 61 might get out of shape, and the Cardan like device interposed between the part spindles of the controlling mechanism prevents any binding of the spindles in such an event which might cause fatigue to the pilot.

The complete bevel wheels which are shown on Fig. 4 may be replaced by sectors of bevel wheels indicated on Fig. 6. This permits useless weight to be done away with, the angular displacement of the hand lever being of course limited.

Figure 8:
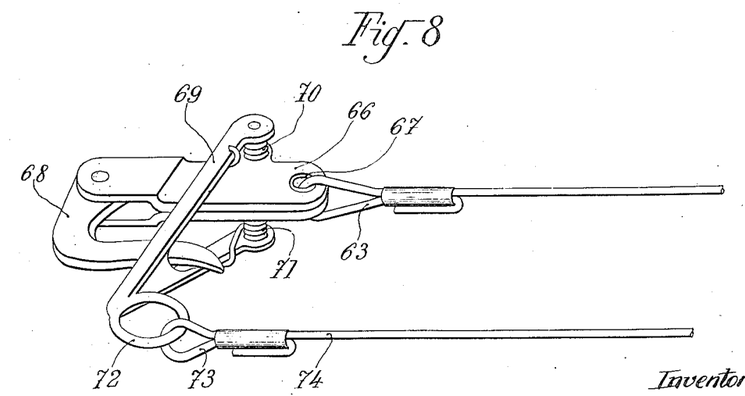
Fig. 8 represents also in the same manner a device for holding the machine ready to be launched by means of stretched rubber ropes, the arrangement also being constructed according to the invention.

The mechanism controlled by man power for holding the machine in the ordinary way, may be replaced by a stake driven into the earth to which is attached the rear end of a steel cord or retaining cable, the forward extremity 63, Fig. 8 of the cord or cable is fixed to a releasing device known as a "grasshopper" which device is illustrated at Fig. 8. This device is so constructed and arranged that it is adapted to engage an elongated slot 64 provided in the vertical plate 65, Fig. 1, which is connected to the lower surface of the fuselage and which is united to the launching hook by a metallic connecting plate. The said releasing device comprises a body 66, Fig. 8, the rear extremity of which is provided with an eye 67 for holding the before mentioned forward end 63 of the retaining cable. The forward extremity of the said body 66 has associated therewith a hook 68 hinged in the same manner as the blade of a pocket knife.

At the middle of the said body 66 of the launching or releasing device is provided a loop or latch 69 somewhat in the shape of a V hinged at its free extremities that is the limbs of the V to the apparatus. The hinge of the said loop or latch is provided with springs 70 and 71 which tend to push it into a position in which it keeps the hook 68 in the closed position. The free extremity of the loop or latch 69 is provided with a ring 72 adapted for the attachment of the forward extremity 73 of a releasing cord 74.

The advantage of using the releasing device just described resides in the fact that a single person takes place of the ordinary crew employed for holding the machine in place. Upon a departure signal given by the pilot, the said person pulls upon the releasing cord 74, the hook 68 is liberated, the releasing device disengages itself from the slot 64 and allows the machine to take flight.

It is to be understood that the invention includes constructions in which the various parts described are replaced by others which are slightly different but have an equivalent effect.

I am aware that most of the parts and the method of construction employed in the glider described are known when considered individually, and I do not claim them individually, but I claim the appropriate combination of the parts and the methods of construction, therefore,

What I claim and desire to secure by Letters Patent of the United States of America is:—

1. A glider comprising a fuselage, a covering extending to a great height and having on its back a ridge representing the ridge of a roof with sharply sloping sides and having an opening for the pilot, without however interrupting the longérons of the fuselage which carry the edge of the roof in the neighbourhood of the opening; two pairs of wing planes arranged in tandem, attached at the ridge of the said roof so as to use the whole spread of the apparatus and in the form of a triple V system: three lower stays for each wing plane commencing at a lower part of the fuselage: ailerons the dimensions of which from the front towards the back are about half the corresponding dimensions of the fixed wing planes, these ailerons extending over the whole spread of each wing: a seat for the pilot below the said opening to the fuselage: a hand lever operating a differential control of the Laroze type in front of the said pilot's seat, the left hand controlling spindle of the said system controlling by means of one of two operating levers the front left hand aileron and by means of the other of two levers the right hand rear aileron, whilst the right hand spindle controls by one of its two levers the right hand front aileron and by the other the left hand rear aileron, so as to cause by a forward movement of the hand lever the raising of the front ailerons and the lowering of the rear ones, and by a movement towards the left of the said hand lever, the raising of the left hand ailerons and the lowering of the right hand ones: a rudder for determining direction controlled by means operated by the feet a landing gear consisting of a frame to hold wheels elastically mounted and provided with rolling wheels: an elastically controlled beak: and a launching hook fixed to the front of the lower surface of the fuselage, the whole constructed and combined substantially as described.

2. An apparatus as claimed in claim 1 characterized by the fact that the landing gear is adapted to be taken to pieces, and comprises a wheel axle, two guides with vertically extending elongated slots fixed to the base of the side walls of the fuselage, two members bent at obtuse angles passed through the said slots and comprising at their outer extremities perforated sleeves adapted to receive the said axle and retained by two eye bolts, the parts being provided at their contiguous extremities with two holes adapted to receive bolts passing through a central connecting sleeve, the said axle and the two pieces bent at an obtuse angle forming when fitted together a trapezoidal frame guided in the vertical direction by the said elongated guides and by two stays the rear extremities of which are pivoted at the said eye bolts whilst the forward extremities are pivotally mounted upon two eye bolts fixed to the lower side longérons of the fuselage, a little behind the nose of the fuselage, the whole substantially as described.

3. A machine as claimed in claim 2 characterized by the fact that the differential controlling system of the Laroze type in place of being provided with complete bevel wheels is provided with bevel sectors, substantially as described.

4. A machine as claimed in claim 1 characterized by the fact that each of the two controlling spindles of the differential control comprises two part spindles connected by a ring sleeve embracing the extremities of the two part spindles where they meet with a small amount of play, the said ring like sleeve being connected to the said part spindles by two rivets located in planes at right angles to one another and passing through the two part spindles so as to form a Cardan like joint between the said part spindles, substantially as described.

5. A machine as claimed in claim 4, characterized by the fact that the lower surface of the fuselage is provided behind the launching hook with a vertical plate having a horizontal elongated slot adapted to engage a releasing apparatus called a "grasshopper," consisting of a body to which is attached the forward extremity of a cable the rear extremity of which is fixed to a retaining stake, a flat hook adapted to be introduced into the before mentioned horizonal elongated slot, the said hook being pivoted to the front extremity of the said releasing device like the blade of a pocket knife, a latch for closing in the form of a V hinged by the free extremities of its arms to the middle of the releasing device, the said latch tending under the influence of the spring system to come over the free extremity of the said hook and comprising a ring forming part of the free extremity which ring is intended for the attachment of the releasing cord all substantially as described.

6. In a glider, the combination of a fuselage comprising a framework consisting of four longitudinally extending longérons and a fifth longéron at considerable height, above the two upper side longérons, transverse supporting members, a covering so arranged with the framework that the upper portion resembles a steeply inclined roof with the uppermost longéron at the ridge, an opening for the pilot so arranged that the continuity of the longéron forming a ridge is not broken, and pairs of wing planes arranged in tandem and attached at their inner edges in the neighbourhood of the ridge, substantially as described.

7. A constructional form of glider as claimed in claim 6, in which the cross members are formed from ply wood with shaped shoulders for enabling the inner edges of the wing planes to be fitted in the neighbourhood of the ridge, substantially as described.

8. A constructional form of machine as claimed in claim 7, in which the transverse members are formed of ply wood reinforced by metal plates comprising perforated part spherical embossments to co-operate with the inner ends of the longérons of the wing planes, substantially as described, 9. A constructional form of glider as claimed in claim 6, in which each of the wing planes is provided with a large aileron, the dimension of which from the front towards the back is about half that of the corresponding wing plane, the aileron extending over the whole spread of the said plane with means for operating the ailerons selectively in transverse or longitudinal pairs or in any required combination, substantially as described.

In testimony whereof I have hereunto set my hand.

LOUIS PEYRET.